(12) United States Patent
Sasaki et al.

(10) Patent No.: US 6,893,521 B2
(45) Date of Patent: May 17, 2005

(54) DOUBLE-SIDE LAMINATION SYSTEM (75) Inventors: Naotaka Sasaki, Kiryu (JP); Shunichi Kawamata, Kiryu (JP); Kenji Sugaya, Kiryu (JP); Hideaki Ito, Kiryu (JP)

(73) Assignee: Japan Servo Co., Ltd., Tokyo (JP)

(*) Notice: Subject to any disclaimer, the term of this patent is extended or adjusted under 35 U.S.C. 154(b) by 0 days.

(21) Appl. No.: 10/808,514

(22) Filed: Mar. 25, 2004

(65) Prior Publication Data

US 2004/0188023 A1 Sep. 30, 2004

(30) Foreign Application Priority Data

Mar. 27, 2003 (JP) ........................................ 2003-086643

(51) Int. Cl.⁷ ............................................. B32B 31/20
(52) U.S. Cl. ..................... 156/64; 156/354; 156/359; 156/363; 156/367; 156/366; 156/555; 156/588.1
(58) Field of Search ................................ 156/359, 354, 156/353, 364, 366, 367, 368, 378, 379, 363, 555, 588.1, 64

(56) References Cited

U.S. PATENT DOCUMENTS

| | | | |
|---|---|---|---|
| 5,306,381 A | * | 4/1994 | Nakazawa et al. ............ 399/69 |
| 5,783,024 A | | 7/1998 | Forkert |
| 5,807,461 A | | 9/1998 | Hagstrom |
| 6,159,327 A | | 12/2000 | Forkert |

* cited by examiner

*Primary Examiner*—J. A. Lorengo
*Assistant Examiner*—George Koch
(74) *Attorney, Agent, or Firm*—Birch, Stewart, Kolasch & Birch, LLP

(57) ABSTRACT

In a double-side lamination system having a thermocompression bonding device for laminating laminate films on both surfaces of a card by applying heat and pressure using a pair of heat rollers, a temperature measurement device for measuring temperatures of the heat rollers are provided, and whether the lamination system is in a double-side lamination mode in which laminations are carried out on both surfaces of the card, or in a single-side lamination mode in which lamination is carried out on one of the surfaces of the card, is automatically distinguished by comparing measured temperatures of the heat rollers at a predetermined time after turn-on of the power of the system with a predetermined reference temperature.

30 Claims, 8 Drawing Sheets

DOUBLE-SIDE LAMINATION SYSTEM

This Nonprovisional application claims priority under 35 U.S.C. § 119(a) on Patent Application No(s). 2003-086643 filed in JAPAN on Mar. 27, 2003, the entire contents of which are hereby incorporated by reference.

BACKGROUND OF THE INVENTION

1. Field of the Invention

The present invention concerns a double-side lamination system for thermocompression bonding of transparent films on both side surfaces of an ID card or the like.

2. Description of the Prior Art

Recently, ID cards of various types are being widely used. In order to protect an ID card from tampering or to improve the life of the ID card, a transparent film of about 30 μm in thickness is laminated by a thermocompression bonding on a surface of the ID card on which information data are printed. Lamination systems such as disclosed in U.S. Pat. No. 5,807,461, U.S. Pat. No. 5,783,024 and U.S. Pat. No. 6,159,327 are known as systems suitable for such lamination.

In the lamination system disclosed in U.S. Pat. No. 5,807,461, a transparent film pre-cut in a predetermined shape (a patch) is mounted on a carrier (a base sheet). The carrier is provided with sensor marks (index markings) for detecting the position of the pre-cut patch on the carrier. The lamination system detects the sensor mark prior to the lamination to detect the position of the pre-cut patch, then tears the patch from the carrier and laminates the patch on the surface of the printed ID card by thermocompression bonding. Such lamination system is undesirable in view of the operational cost and the protection of the environment, since the carrier is thrown away as a waste material.

In a lamination system such as disclosed in U.S. Pat. No. 5,783,024 or in U.S. Pat. No. 6,159,327, a leading edge of a continuous transparent laminate film is drawn out from a supply roll, then transferred along a film transfer path, and then cut into a predetermined length. The cut laminate film is further transferred along the film transfer path to a convergence zone. On the other hand, a card is put into the lamination system after being printed by a card printer. The card is also transferred along a card transfer path to the convergence zone. The cut laminate film is laid on the card at the convergence zone. The cut laminate film and the card are then transferred to a thermocompression bonding part, where they are bonded with each other by thermocompression bonding using a heat roller or heat rollers provided there.

Such lamination system, also called wasteless type lamination system, is advantageous since the laminate film is used after being cut in a necessary length, and accordingly, no waste carrier such as in the lamination system disclosed in U.S. Pat. No. 5,807,461 is left.

The lamination system disclosed in U.S. Pat. No. 6,159,327 is a double-side lamination system that is to be used solely for double-side lamination. However, some cards are required to be laminated on both surfaces, others are required to be laminated on only one surface of each of the cards, depending on the types of the cards such as driver's licence cards, ID cards or social insurance cards, for example. Since the lamination system disclosed in U.S. Pat. No. 6,159,327 can be used for only double-side lamination, and can not be used for lamination in accordance with various types of the cards, there is a problem that a user of the lamination system is obliged to prepare a plurality of different lamination systems and to select and use one of them in accordance with the type of the cards to be issued.

SUMMARY OF THE INVENTION

It is an object of the present invention to solve the above problem and to provide a double-side lamination system capable of laminating in accordance with the various types of the cards by only itself, and lowering the operational cost while contributing to the environmental protection by minimizing the waste material.

A double-side lamination system according to a preferred embodiment of the present invention to achieve the above object, comprises a thermocompression bonding means for laminating laminate films each having a heat adhesive layer on a surface, on both surfaces of a card, applying heat and pressure using a pair of heat rollers, wherein temperature measurement means for measuring temperatures of the heat rollers are provided, and whether the double-side lamination system is in a double-side lamination mode in which laminations are carried out on both surfaces of the card, or in a single-side lamination mode in which lamination is carried out on only one of the surfaces of the card, is automatically distinguished by comparing the measured temperatures of the heat rollers by the temperature measurement means at a predetermined time after turn-on of the power of the double-side lamination system with a predetermined reference temperature.

In carrying out the invention in one preferred mode, if one of the measured temperatures of the heat rollers is lower than the reference temperature, then lamination is not carried out for the surface of the card facing the roller of which measured temperatures is lower than the reference temperature, and single-side lamination for laminating another surface of the card using another heat roller is automatically carried out.

Further in carrying out the invention in another preferred mode, whether the double-side lamination system is in the double-side lamination mode or in the single-side lamination mode is displayed on a control panel.

Further in carrying out the invention in another preferred mode, a drive system control of a laminate film transfer path is automatically changed according to whether the double-side lamination system is in the double-side lamination mode or in the single-side lamination mode.

Further in carrying out the invention in another preferred mode, a type of the heat roller mounted is distinguished by a value of temperature of the heat roller at the predetermined time after turn-on of the power of the double-side lamination system, and internal control parameters are automatically optimized according to the type of the heat roller.

In the double-side lamination system according to the preferred embodiment of the present invention, the temperatures of the heat rollers at the predetermined time after turn-on of the power of the double-side lamination system are measured by the temperature measurement means, and whether the double-side lamination system is in the double-side lamination mode in which the laminations are carried out on both surfaces of the card, or in the single-side lamination mode in which the lamination is carried out on only one of the surfaces of the card, is automatically distinguished by comparing the measured temperatures of the heat rollers with the predetermined reference temperature. Therefore, the double-side lamination system can be used in accordance with the lamination mode. Accordingly, it is possible to deal with the various types of the cards by only one system.

Further, by applying the features of the present invention to a wasteless type double-side lamination system, it is possible to provide the double-side lamination system capable of lowering the operational cost while contributing to the environmental protection by minimizing the waste material.

Additionally, the features of the present invention can also be applied to a lamination system of another type, such as mentioned in the description of the prior art, in which "pre-cut laminate films" on the carrier are used.

DETAILED DESCRIPTION OF THE INVENTION

Figure 1:
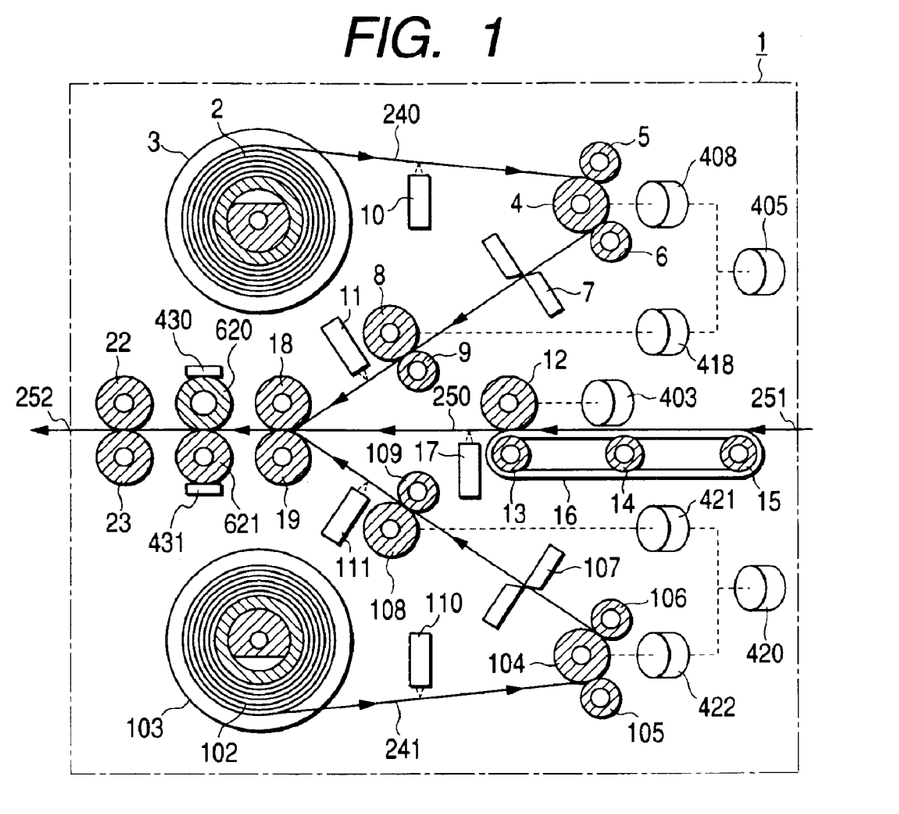
FIG. 1 is a schematic front view of a double-side lamination system according to an embodiment of the present invention.

FIG. 1 is a schematic front view of a double-side lamination system 1 according to an embodiment of the present invention. The double-side lamination system 1 of which overall construction is shown in FIG. 1 is an system for making lamination on both surfaces of an ID card.

A transparent continuous laminate film with a heat adhesive layer on a surface is loaded in a form of a laminate roll 2 on a supply spindle 3. A leading edge of the continuous laminate film is drawn out from the laminate roll 2 and transferred along a film transfer path 240.

A laminate film supply monitoring sensor 10 composed of an optical sensor such as a reflective type optical sensor, for example, is provided along the film transfer path 240 and monitors the supply of the continuous laminate film.

The continuous laminate film is transferred, passing through rollers 4, 5 and 6, two cutting blades of a cutter 7, rollers 8 and 9, and under a film detection sensor 11 composed of an optical sensor such as a reflective type optical sensor, for example.

Distance L between the cutter 7 and the film detection sensor 11 is set to be a predetermined design value of the system.

Another film transfer path 241 is provided in the other side of a card transfer path 250, that will be explained later, approximately symmetrically to the film transfer path 240 about the card transfer path 250. Another transparent continuous laminate film with a heat adhesive layer on a surface is loaded in a form of a laminate roll 102 on a supply spindle 103. A leading edge of the continuous laminate film is drawn out from the laminate roll 102 and transferred along the film transfer path 241.

A laminate film supply monitoring sensor 110 composed of an optical sensor such as a reflective type optical sensor, for example, is provided along the film transfer path 241 and monitors the supply of the continuous laminate film.

The continuous laminate film is transferred, passing through rollers 104, 105 and 106, two cutting blades of a cutter 107, rollers 108 and 109, and under a film detection sensor 111 composed of an optical sensor such as a reflective type optical sensor, for example.

Distance L between the cutter 107 and the film detection sensor 111 is set to be a predetermined design value of the system.

On the other hand, a printed ID card made of resin is put into an inlet 251 of the double-side lamination system 1. Then, the printed ID card is transferred on a belt 16 driven by rollers 13 to 15, then transferred along a card transfer path 250 being held by a part of the belt 16 on the roller 13 and a roller 12 opposing to the belt 16. The printed ID card is further transferred to a point of convergence, composed of a rollers 18 and 19, at which the film transfer path 240, the film transfer path 241 and the card transfer path 250 converge, after being positioned for registration using a detection signal detected by a card edge detection sensor 17 composed of an optical sensor such as a reflective type optical sensor, for example.

Drive force of a laminate film transfer motor 405 is transmitted to the roller 4 through a laminate load electric clutch 408. The drive force is further transmitted to the rollers 5 and 6 through the roller 4 and the respective gears (not illustrated). Similarly, the drive force is also transmitted to the roller 8 through a laminate feed electric clutch 418, and from the roller 8 to the roller 9 through a gear (not illustrated).

In this embodiment, a stepping motor is adopted as the laminate film transfer motor 405. Since an amount of rotation of a stepping motor can be precisely and easily controlled by controlling a number of drive pulses, amounts of rotation of the roller 4 and the roller 8 can also be precisely and easily controlled.

Further, by combining on/off controls of the laminate load electric clutch 408 and the laminate feed electric clutch 418 with the rotation control of the motor, transfer of the laminate film can be made more minutely.

Also in the film transfer path 241, similarly to that in the film transfer path 24, drive force of a laminate film transfer motor 420 is transmitted to the roller 104 through a laminate load electric clutch 422. The drive force is further transmitted to the rollers 105 and 106 through the roller 104 and the respective gears (not illustrated). Similarly, the drive force is also transmitted to a roller 108 through a laminate feed electric clutch 421, and from the roller 108 to a roller 109 through a gear (not illustrated).

The printed ID card is transferred by drive force of a card transfer motor 403. By also adopting a stepping motor as the card transfer motor 403, transfer of the card can be minutely controlled by controlling a number of drive pulses for the stepping motor.

Drive force of the card transfer motor 403 is transmitted to the roller 12, and then from a drive shaft (not illustrated) of the roller 12 to the rollers 13 and 18, a heat roller 620 and a roller 22 through such as gears and/or synchronous belts (not illustrated). The drive force is further transmitted from these rollers to rollers opposing to these rollers through the respective gears (not illustrated).

Additionally, the laminate film transfer motors 405 and 420 can be omitted. In this case, the drive force of the card transfer motor 403 is transmitted to the rollers in the film transfer systems through appropriate electric clutches. Further, a servomotor such as a rotary encoder with a number of rotation sensor can be used as the drive source in place of the stepping motor.

Figure 2:
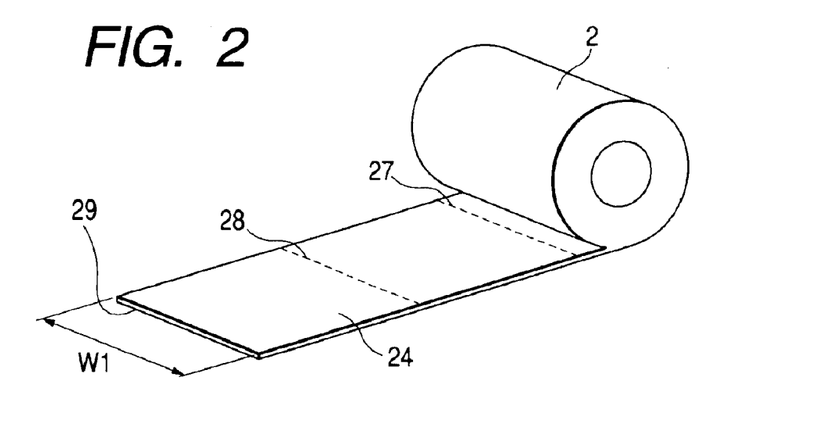
FIG. 2 is a schematic perspective view of an example of a laminate roll of a continuous laminate film suitable for use in the practice of the present invention.

FIG. 2 is a schematic perspective view of an example of the laminate roll 2 of the continuous laminate film 24 suitable for use in the practice of the present invention. As shown, the leading edge 29 of the continuous laminate film 24 is drawn out from the laminate roll 2 and cut successively along a cutting line 28, a cutting line 27 and so forth by the cutter 7. The continuous laminate film 24 may be a transparent film, or may be a film treated to have a hologram surface for preventing from forgery.

Figure 3:
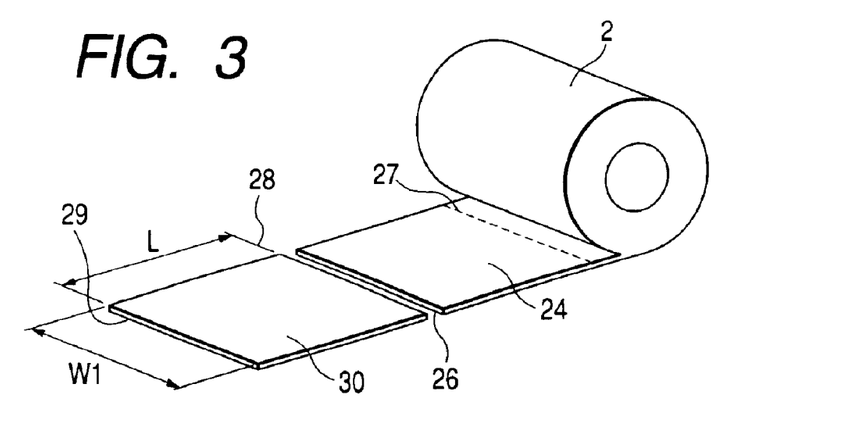
FIG. 3 is a schematic perspective view of the laminate roll of the laminate film in FIG. 2 after the laminate film is cut from the laminate roll.

FIG. 3 is a perspective view of the cut laminate film 30. As shown, the continuous laminate film 24 is cut along the cutting line 28 at a distance L from the leading edge 29. A cut edge 26 becomes a new leading edge of the continuous laminate film 24 to be cut next.

Another continuous laminate film to be used for laminating another surface of the card is also drawn out from the laminate roll 102 and cut similarly.

Figure 4:
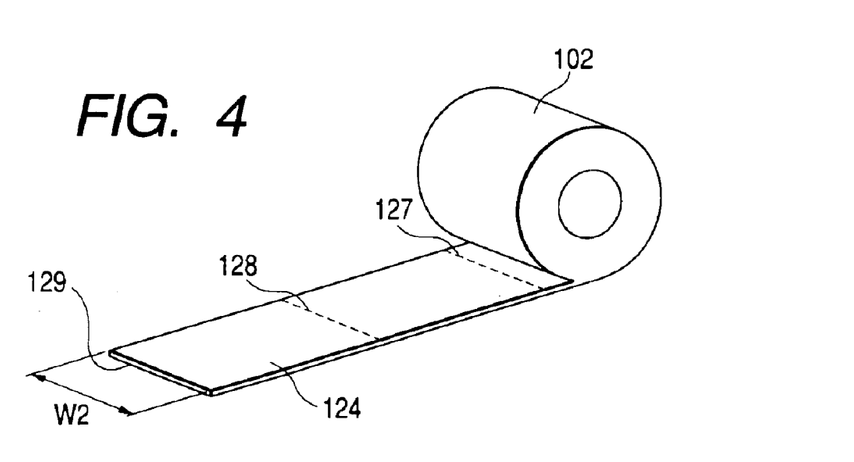
FIG. 4 is a schematic perspective view of another example of a laminate roll of a continuous laminate film suitable for use in the practice of the present invention.

FIG. 4 is a schematic perspective view of an example of the laminate roll 102 of the continuous laminate film 124 suitable for use in the practice of the present invention. In order to avoid lamination on a magnetic stripe provided on a surface of the card, the continuous laminate film 124 has width W2 smaller than width W1 of the continuous laminate film 24. Similarly to the continuous laminate film 24, the leading edge 129 of the continuous laminate film 124 is drawn out from the laminate roll 102 and cut successively along a cutting line 128, a cutting line 127 and so forth by the cutter 107. The continuous laminate film 124 may also be a transparent film, or may also be a film treated to have a hologram surface for preventing from forgery.

Figure 5:
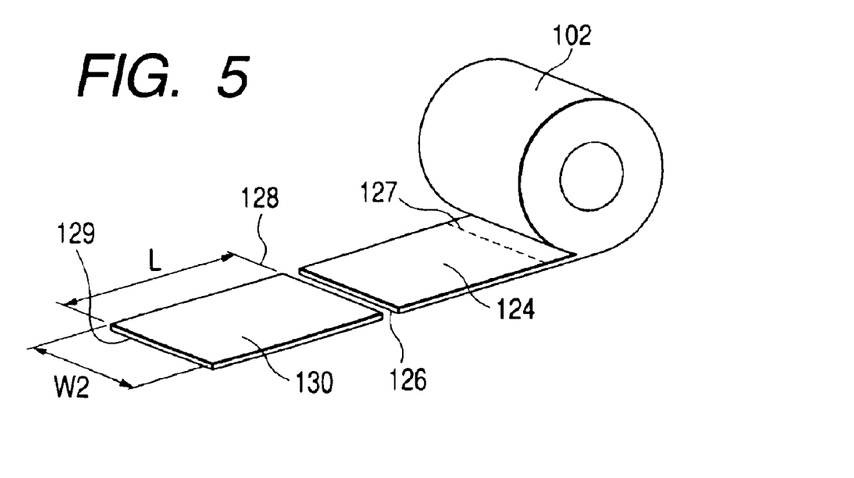
FIG. 5 is a schematic perspective view of the laminate roll of the laminate film in FIG. 4 after the laminate film is cut from the laminate roll.

FIG. 5 is a perspective view of the cut laminate film 130. As shown, the continuous laminate film 124 is cut along the cutting line 128 at a distance L from the leading edge 129. A cut edge 126 becomes a new leading edge of the continuous laminate film 124 to be cut next.

Additionally, if the card has no magnetic stripe on the surface to be laminated, a laminate roll of a continuous laminate film having the width same to the width W1 of the continuous laminate film 24 may be loaded on the supply spindle 103 and used.

The cut laminate films 30 and 130 are laid respectively on the top or back of the printed ID card at the aforementioned point of convergence. Then, the printed ID card and the cut laminate films 30 and 130 are transferred to a place between the heat roller 620 and another heat roller 621 (FIG. 1) composing a thermocompression bonding means provided at the downstream and are laminated there by thermocompression bonding. A temperature sensing element 430, that is a temperature measurement means, is attached slidably in contact with a surface of the heat roller 620 (FIG. 1). Another temperature sensing element 431, that is another temperature detection means, is also attached slidably in contact with a surface of the heat roller 621 (FIG. 1). Surface temperatures of the heat rollers 620 and 621 of the double-side lamination system 1 in operation are continuously monitored by these temperature sensing elements 430 and 431, and are controlled to be suitable temperatures.

The ID card 31 laminated by the heat rollers 620 and 621 is transferred through rollers 22 and 23 to be discharged from an outlet 252 (FIG. 1).

Figure 6:
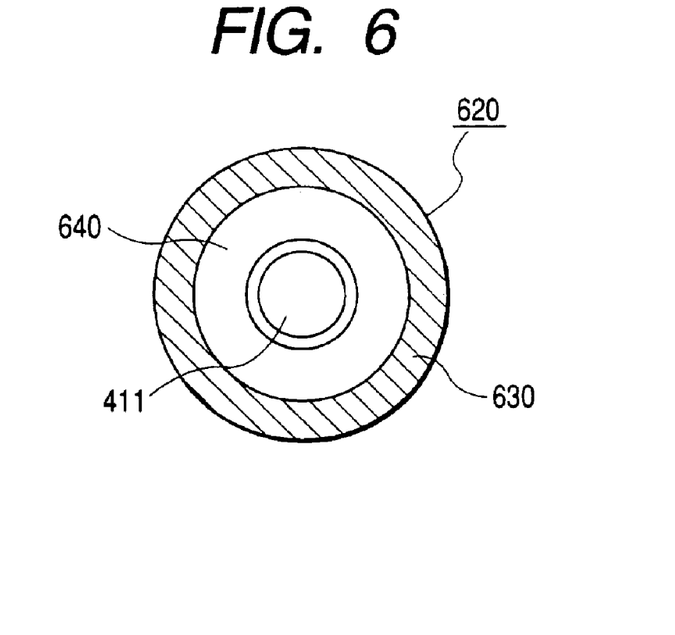
FIG. 6 is a cross-sectional view of an example of a heat roller.

FIG. 6 is a cross-sectional view of an example of the heat roller 620. The heat roller 620 comprises a cylindrical central pipe 640 made of an aluminum material and a silicone rubber 630 of several millimeters in thickness winded closely around the outer surface of the cylindrical central pipe 640. A tubular hole is provided in the central portion of the central pipe 640. A heater 411 is placed in the hole. Heat of the heater 411 is transmitted to the silicone rubber 630 through the central pipe 640. A temperature sensing element 430 is attached slidably in contact with the surface of the heat roller 620. Thus, the state of heat transmission from the heater 411 can be known.

Additionally, the heat roller 620 is attached to the heater 411 rotatably and detachably so that the heat roller 620 can be exchanged according to the uses.

Since the silicone rubber 630, winded around the outer surface of the cylindrical central pipe 640, has a suitable elasticity, variation in thickness of cards can be absorbed when they are placed between the heat roller 620 and the heat roller 621 for being laminated on both surfaces of cards. Further, the silicone rubber 630 is inexpensive. Accordingly, the silicone rubber 630 is suitable to be used as a composing element of the heat rollers 620, 621 in the double-side lamination system for thermocompression bonding of transparent films on both side surfaces of an ID card or the like made of a high heat resistant material.

However, since heat conductivity of a silicone rubber is low, there is a problem that it is difficult to raise lamination speed, that is, card transfer velocity in thermocompression bonding. Further, there is another problem that a silicone rubber is easily deteriorated and low in durability.

Figure 7:
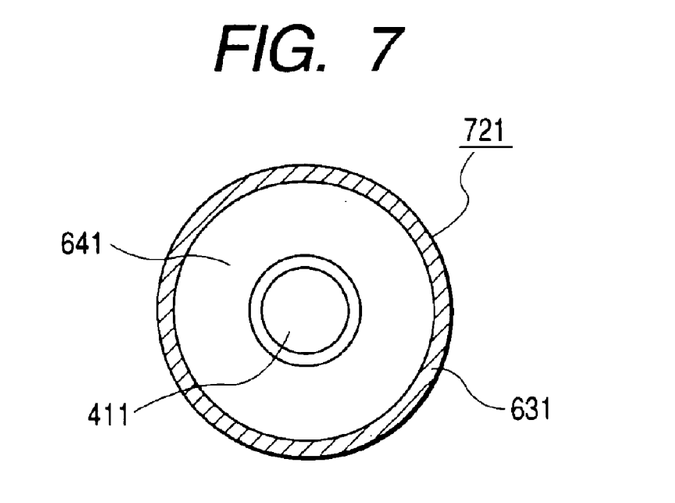
FIG. 7 is a cross-sectional view of another example of a heat roller.

FIG. 7 is a cross-sectional view showing another example of a heat roller 721. Similarly to the heat roller 620 (FIG. 6), the heat roller 721 comprises a cylindrical central pipe 641 also made of an aluminum material and a lubricating film 631 composed of a fluoric material of several tens of microns in thickness coated on the outer surface of the cylindrical central pipe 641. A tubular hole is also provided in the central portion of the central pipe 641. A heater 411 is also placed in the hole.

Since such heat roller shows a good heat transmission characteristic, it is capable of reducing cold start time of the double-side lamination system 1 as well as raising lamination speed for such as a PVC card of relatively low price, and it has excellent durability. However, the surface treatment of the heat roller is expensive.

In carrying out lamination for cards made of various materials using the heat rollers as mentioned above, it is necessary to select a lamination condition, including a heat controlling condition, suitable for the heat roller mounted on the double-side lamination system 1 and also suitable for the material of the card to be laminated. If a suitable lamination condition is not selected, then a defect such as a warp in the laminated card may occur and the quality of the card may be deteriorated. As a result, the printed ID card may be degraded. Further, in case that a lamination is made at an insufficient temperature, separation of the laminate film from the surface of the card and/or jam in the lamination system may occur.

In order to avoid problems as mentioned above, a judgement means is provided in the double-side lamination system 1 according to the embodiment of the present invention.

The judgement means monitors surface temperatures of the heat rollers after turn-on of the power source of the double-side lamination system 1 using the temperature sensing elements, identifies a type of each of the heat rollers by each of the temperatures at a predetermined time after the turn-on of the power source, and judges if the heat rollers are ready for lamination.

Figure 8:
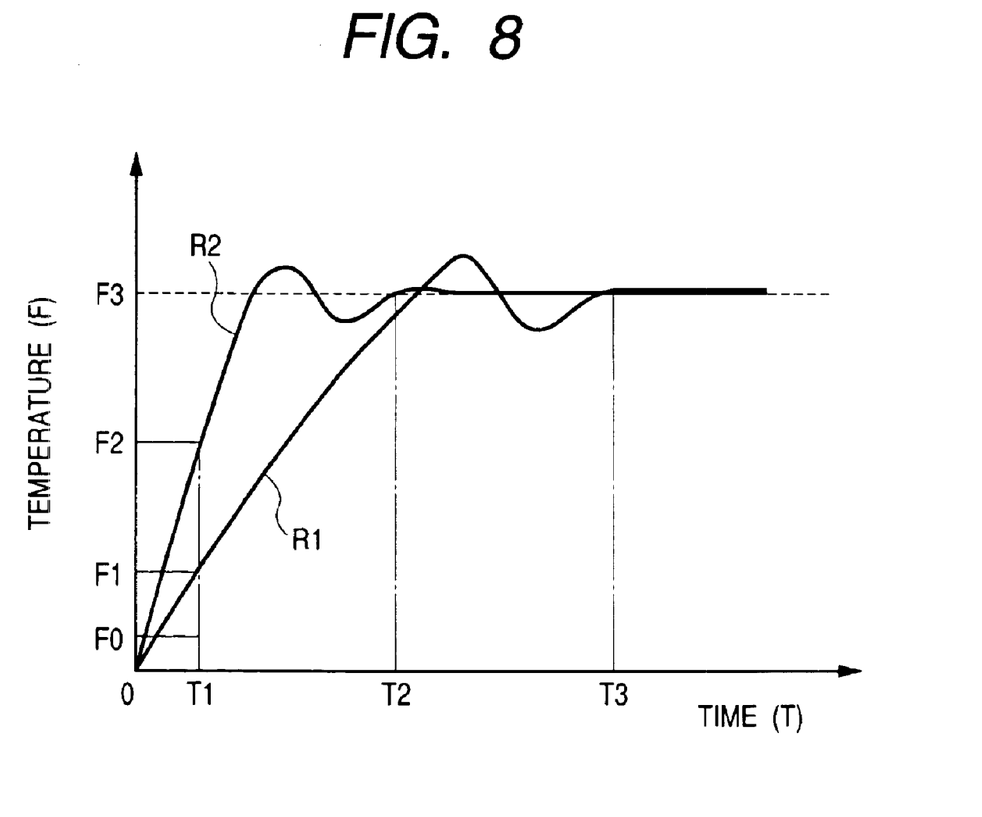
FIG. 8 is a graph showing relations between time after turn-on of the power and surface temperatures of heat rollers.

FIG. 8 is a graph showing relations between time T after turn-on of the power of the system and surface temperatures F of a heat roller 620 and a heat roller 721. In the graph, a curve R1 shows the surface temperature of the heat roller 620, whereas a curve R2 shows the surface temperatures of the heat roller 721. The surface temperatures of the heat roller 620 and the heat roller 721 at T1 after turn-on of the power of the system are F1 and F2, respectively. Such temperatures as F1 and F2 are measured beforehand and recorded in a controller in the double-side lamination system 1 that will be explained later. Each of these temperatures such as F1 and F2 is a value inherent to each of types of the heat rollers. Accordingly, these data can be used as reference data for identifying the types of the heat rollers. Thus, a type of a heat roller mounted in the double-side lamination system 1 can be known by comparing a temperature at T1 after turn-on of the power of the system with the reference data recorded in the controller. Accordingly, in case that a heat roller is exchanged according to a material of a card to be laminated, the double-side lamination system 1 can automatically identify the heat roller, and can automatically optimize the internal control parameters in accordance with the type of the heat roller.

Further, another reference temperature F0 lower than temperatures F1 and F2 is set and stored in a processor in the controller in the double-side lamination system 1.

Heat transmission from the heater 411 to the outer surface of the heat roller can be reduced by making the diameter of the tubular hole in the central portion of the central pipe of the heat roller larger, for example. Such heat roller of which heat transmission from the heater 411 to the outer surface of the heat roller is reduced can be used as a simple platen roller that does not apply heat. If such heat roller is mounted in the double-side lamination system 1, the surface temperatures of the heat roller at T1 after turn-on of the power of the system is lower than the reference temperature F0. If it is the case, a single-side lamination in which lamination is not made for the surface of the card facing such heat roller, and lamination is made only for another surface of the card using another heat roller. By displaying such lamination mode on a control panel, an operator can be notified of the lamination mode being carried out, and control for the driving system of the film transfer path that has become disused can be inactivated. Thus, it is possible to automatically distinguish the lamination mode whether it is double-side lamination mode or single-side lamination mode, and to change the control for the driving system of the film transfer path accordingly.

Now, explanation is made for a controller used in the double-side lamination system 1 according to the present invention.

Figure 9:
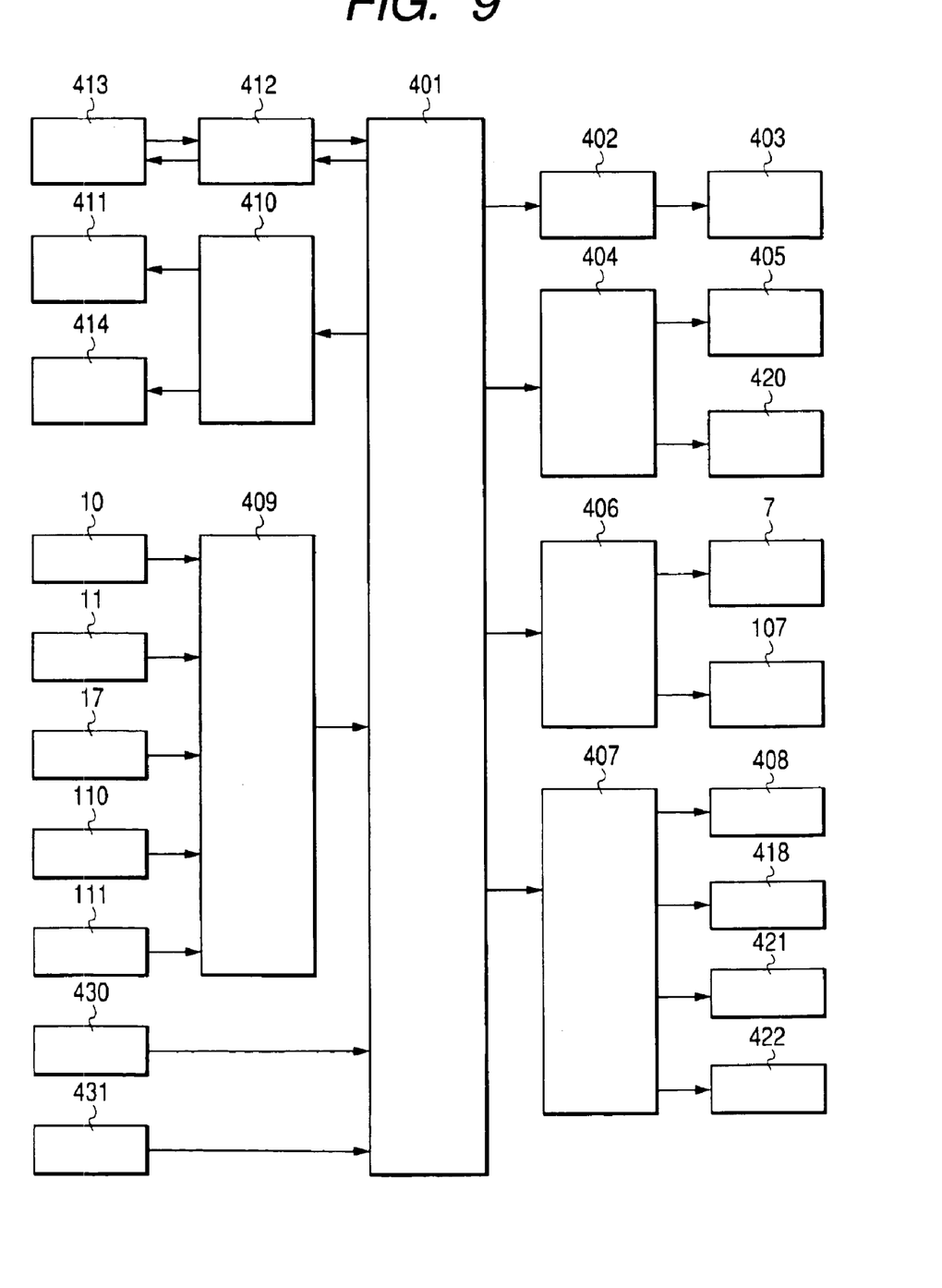
FIG. 9 is a block diagram of a controller for controlling the double-side lamination system according to the embodiment of the present invention.

FIG. 9 is a block diagram of a controller for controlling the double-side lamination system 1 according to the embodiment of the present invention.

The controller comprises; an arithmetic processing part 401 constituting the central portion and composed of micro processors for example, a card transfer control part 402, the card transfer motor 403, a laminate film transfer control part 404, the laminate film transfer motor 405 and the laminate film transfer motor 420, a cutter drive part 406, a clutch drive part 407, the laminate load electric clutch 408 and the laminate load electric clutch 422, the laminate feed electric clutch 418 and the laminate feed electric clutch 421, a sensor signal processing part 409, a heater temperature control part 410, the heater 411 and the heater 414, a control panel signal processing part 412 and a control panel 413.

Output terminals of the temperature sensing element 430 and the temperature sensing element 431 (FIG. 1) are directly connected to an A-D converter provided in the arithmetic processing part 401. Temperatures measured by the temperature sensing elements are transformed into digital values and used in the arithmetic processing in the arithmetic processing part 401.

The laminate load electric clutch 408 connects or disconnects driving force of the laminate film transfer motor 405 (FIG. 1) to the roller 4 (FIG. 1). The laminate feed electric clutch 418 connects or disconnects driving force of the laminate film transfer motor 405 to the roller 8 (FIG. 1). Similarly, the laminate load electric clutch 422 connects or disconnects driving force of the laminate film transfer motor 420 (FIG. 1) to the roller 104 (FIG. 1). The laminate feed electric clutch 421 connects or disconnects driving force of the laminate film transfer motor 420 to the roller 108 (FIG. 1). Additionally, the roller 5 and the roller 6 (FIG. 1) are connected to the roller 4 through gears attached to the respective shafts (not illustrated). Also, the roller 8 and the roller 9 are connected with each other through gears attached to the respective shafts (not illustrated). Similarly, the roller 105 and the roller 106 (FIG. 1) are connected to the roller 104 through gears attached to the respective shafts (not illustrated). Also, the roller 108 and the roller 109 are connected with each other through gears attached to the respective shafts (not illustrated). The rollers provided along the card transfer path 250 are driven by the drive force of the card transfer motor 403.

Operation of the controller with regard to the double-side lamination system 1 according to the embodiment of the present invention is as follows.

When the power source of the double-side lamination system 1 is turned-on, the arithmetic processing part 401 initializes the internal arithmetic processing, then displays input menu of various lamination conditions on the control panel 413, and then stands by waiting for a key input by an operator.

When the key input is made by the operator, the arithmetic processing part 401 monitors temperatures measured by the temperature sensing element 430 and the temperature sensing element 431 at time T1 after turn-on of the power of the system.

If both of the measured temperatures at the surfaces of the heat roller 620 and the heat roller 621 are equal to F1, then the heat roller 620 and the heat roller 621 are judged to be the heat rollers of the same type having heat characteristics such as represented by the curve R1 (FIG. 8). Accordingly, the arithmetic processing part 401 transmits a drive instruction to the card transfer motor 403 to lower the lamination speed at subsequent thermocompression bonding process.

When the temperature at the surface of the heat roller 620 reaches a predetermined temperature F3 (FIG. 8), the arithmetic processing part 401 rotates, through the laminate film transfer control part 404, the laminate film transfer motor 405 to draw out the continuous laminate film 24. At the same time, the arithmetic processing part 401 makes the laminate load electric clutch 408 and the laminate feed electric clutch 418 "connected" state, through the clutch drive part 407. Then, the roller 4 and the roller 8 are rotated being synchronized with each other, and the laminate film 24 is transferred until the leading edge 29 (FIG. 2) reaches a responsive position of the film detection sensor 11. When the leading edge 29 of the laminate film 24 reaches the responsive position of the film detection sensor 11, the output signal of the film detection sensor 11 becomes activated. The activated output signal is transmitted through the sensor signal processing part 409 into the arithmetic processing part 401.

The arithmetic processing part 401 stores temporarily the point at which the activated signal is transmitted as a position information in an internal memory. The position information is referred to later as a reference point for laying the cut laminate film on the printed ID card when the printed ID card is transferred being synchronized with the transfer of the laminate film.

When the arithmetic processing part 401 receives the activated sensor signal, it stops the rotation of the laminate film transfer motor 405 through the laminate film transfer control part 404. At the same time, the arithmetic processing part 401 drives the cutter 7, through the cutter drive part 406, to cut the laminate film 24.

After the laminate film 24 is cut, the arithmetic processing part 401 makes the laminate feed electric clutch 418 "connected" state and the laminate load electric clutch 408 "disconnected" state, through the clutch drive part 407. Then, the arithmetic processing part 401 rotates the laminate film transfer motor 405 through the laminate film transfer control part 404. Consequently, the cut laminate film 30 is transferred into the downstream.

The process explained above is also carried out similarly for the drive system of the film transfer path 241.

Additionally, the reference temperature F0, temperature F1 and temperature F2 used in judging the type of the heat roller are stored beforehand in the internal memory of the arithmetic processing part 401.

Figure 10:
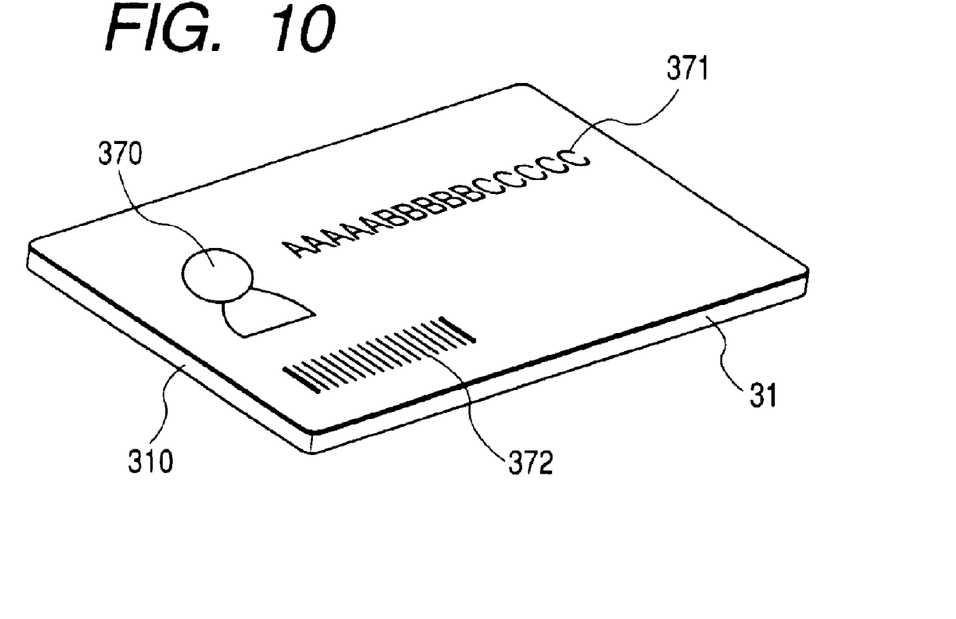
FIG. 10 is a perspective view showing an example of a top of an ID card.
Figure 11:
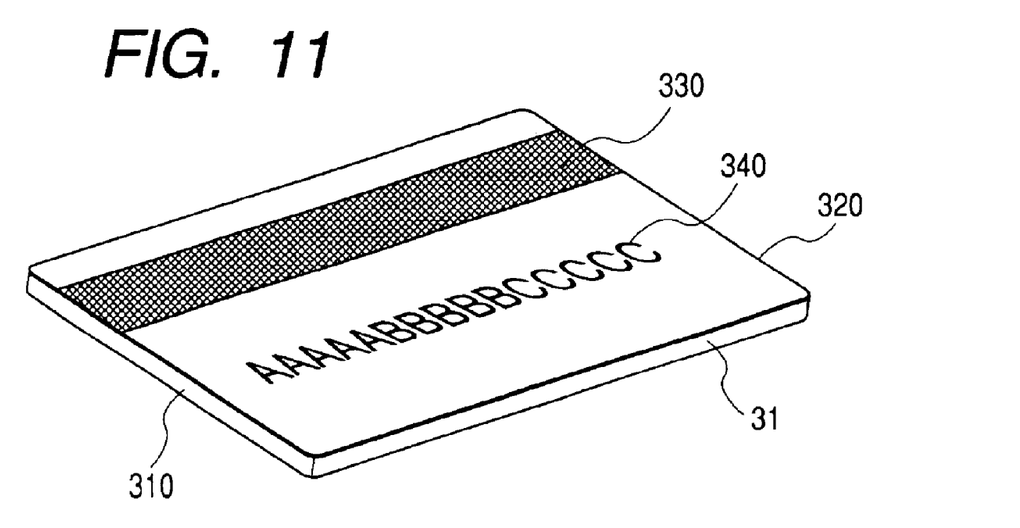
FIG. 11 is a perspective view showing an example of a back of an ID card.

FIG. 10 is a perspective view showing an example of a top of an ID card, whereas FIG. 11 is a perspective view showing an example of a back of an ID card. As shown in these figures, on the top of the printed ID card transferred along the card transfer path 250 (FIG. 1), such as a photograph of one's face 370, personal character data 371 and a bar code 372, for example, are printed by a card printer (not illustrated). Also, on the back of the ID card, such as magnetic stripe 330 and letters 340, for example, are recorded or printed.

When such printed ID card 31 is put into the inlet 251 (FIG. 1) of the double-side lamination system 1, the leading edge 310 of the printed ID card 31 is detected by the card edge detection sensor 17 (FIG. 1), the output signal of which is transmitted to the arithmetic processing part 401 through the sensor signal processing part 409. This signal is temporarily stored as the position information in the internal memory of the arithmetic processing part 401 and referred to as the reference point for the succeeding control of the transfer of the printed ID card 31.

Figure 12:
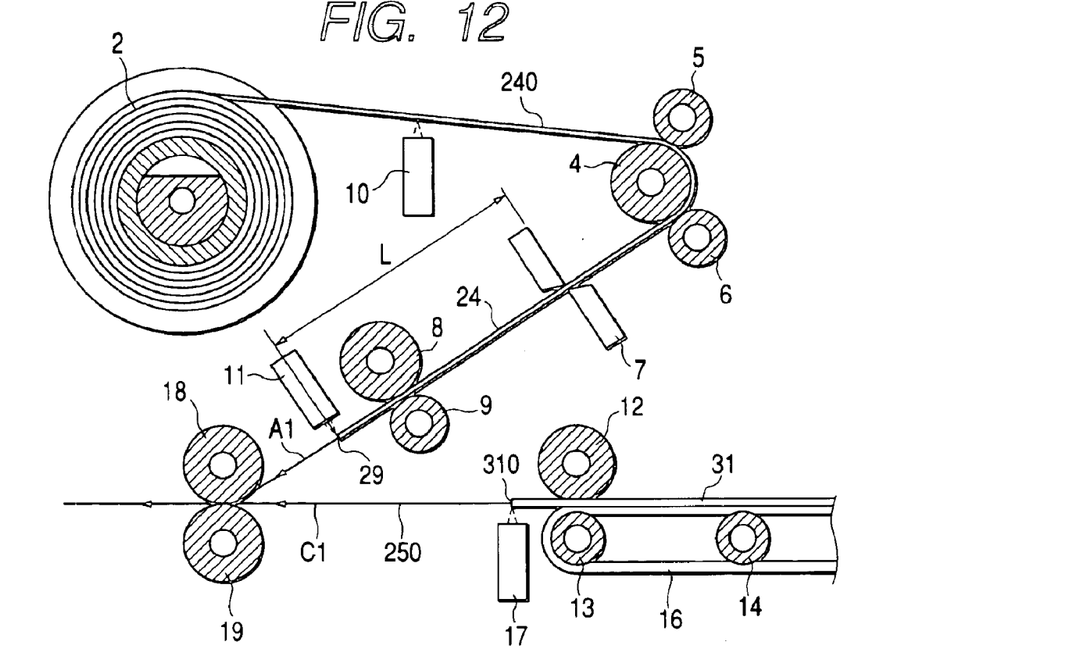
FIG. 12 is a partial schematic front view of the double-side lamination system according to the embodiment of the present invention, immediately before the laminate film is cut.

Thus, the printed ID card 31 is transferred along the card transfer path 250 shown in the direction indicated by an arrow C1 (FIG. 12). The amount of the transfer of the printed ID card 31 is controlled by the rollers such as the roller 12 connected to the card transfer motor 403 that is controlled by a command pulse signal.

Similarly, each of the cut laminate films is transferred along the film transfer path 240 or the film transfer path 241 (FIG. 1) respectively, being synchronized with the transfer of the printed ID card 31.

Each of the cut laminate films is laid on the top or the back of the printed ID card 31 respectively at the point of convergence of the film transfer path 240, the film transfer path 241 and the card transfer path 250. Then the cut laminate films and the printed ID card 31 are transferred to the place between the heat roller 620 and the heat roller 621 (FIG. 1) provided at the downstream. Each of the heat roller 620 and the heat roller 621 is being heated by the heater 411 or by the heater 414, respectively. The temperatures at the surfaces of the heat roller 620 and the heat roller 621 are controlled respectively to be the optimum values for lamination by the heater temperature control part 410. Here, temperature control parameters are selected to be optimum values according to the types of the heat rollers that have been judged. Thus, each of the cut laminate films is certainly laminated respectively on the top or back of the printed ID card 31 by thermocompression bonding.

In the meantime, if any one of the temperatures at the surfaces of the heat roller 620 and the heat roller 621, measured by the temperature sensing element 430 or the sensing element 431, at the time T1 after turn-on of the power of the system, is lower than F0 (FIG. 8), then the corresponding heat roller is judged to be such one that should be used as a simple platen roller, feeding of the electric current to the heater in this heat roller is stopped, and a process of single-side lamination is carried out using only another heat roller. Control of the drive system for the film transfer path that has become needless because of the stop of the lamination is inactivated by stopping the transmission of drive signal from the arithmetic processing part 401 to the drive system of the film transfer path.

The sequence for the lamination on only top of the card and the sequence for the lamination on only back of the card are identical with each other. Accordingly, change from the former to the latter, for example, can be made by simply changing the heater to be fed electric current from the heater 411 to the heater 414, and by changing laminate film transfer path to be activated from the laminate film transfer path 240 to the laminate film transfer path 241.

Figure 14:
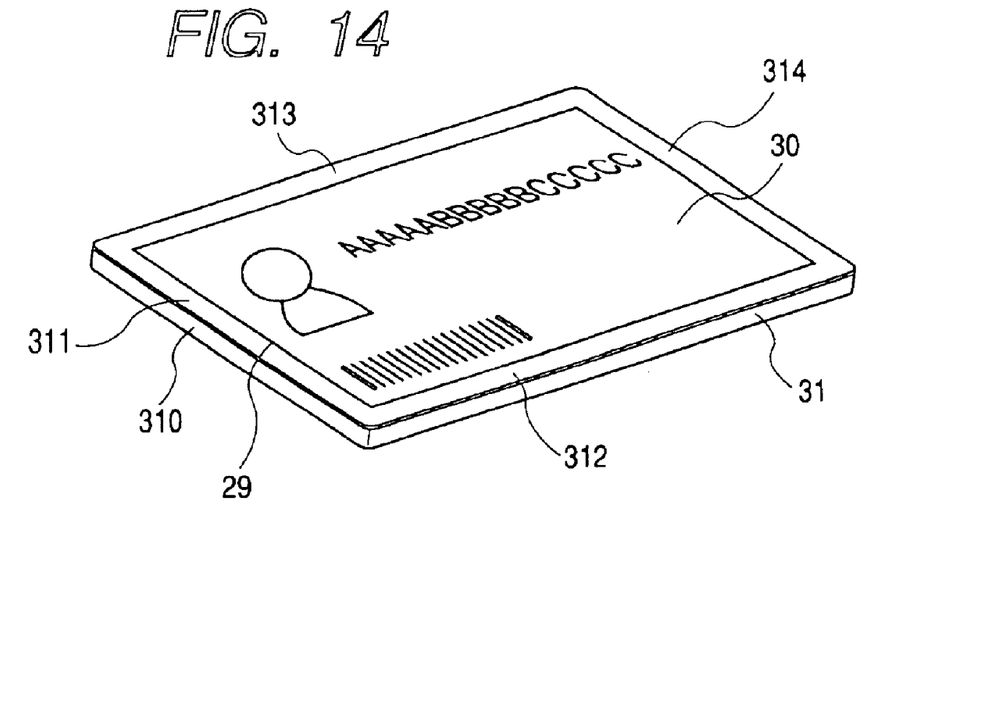
FIG. 14 is a perspective view of an ID card on the top of which the lamination is completed.
Figure 15:
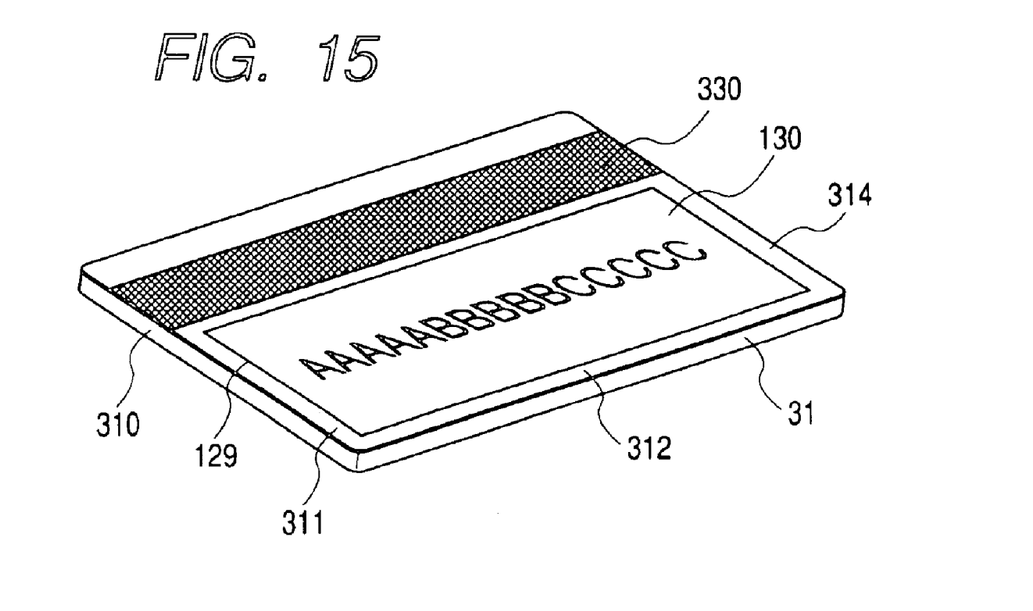
FIG. 15 is a perspective view of an ID card on the back of which the lamination is completed.

Further, when both of the heater 411 and the heater 414 are fed electric current according to the type of the heat roller, and both of the drive systems for the laminate film transfer path 240 and for the laminate film transfer path 241 are activated in the predetermined sequence, then double-side lamination is carried out and the top as well as the bottom of the card is laminated as illustrated in FIGS. 14 and 15.

Next, transfer process of the laminate film in the double-side lamination system 1 according to the embodiment of the present invention is explained briefly referring to FIG. 1.

The laminate roll 2 is loaded on the supply spindle 3 of the double-side lamination system 1. The continuous laminate film of which leading edge is drawn out from the laminate roll 2 is successively cut and transferred along the film transfer path 240. Similarly, the laminate roll 102 is loaded on the supply spindle 103. The continuous laminate film of which leading edge is drawn out from the laminate roll 102 is successively cut and transferred along the film transfer path 241.

Now, cutting process of the continuous laminate film of which leading edge is drawn out from the laminate roll 2 on the film transfer path 240 is explained below. Cutting process of the continuous laminate film of which leading edge is drawn out from the laminate roll 102 on the film transfer path 241 is similar to that on the film transfer path 240, so the explanation is omitted.

Figure 13:
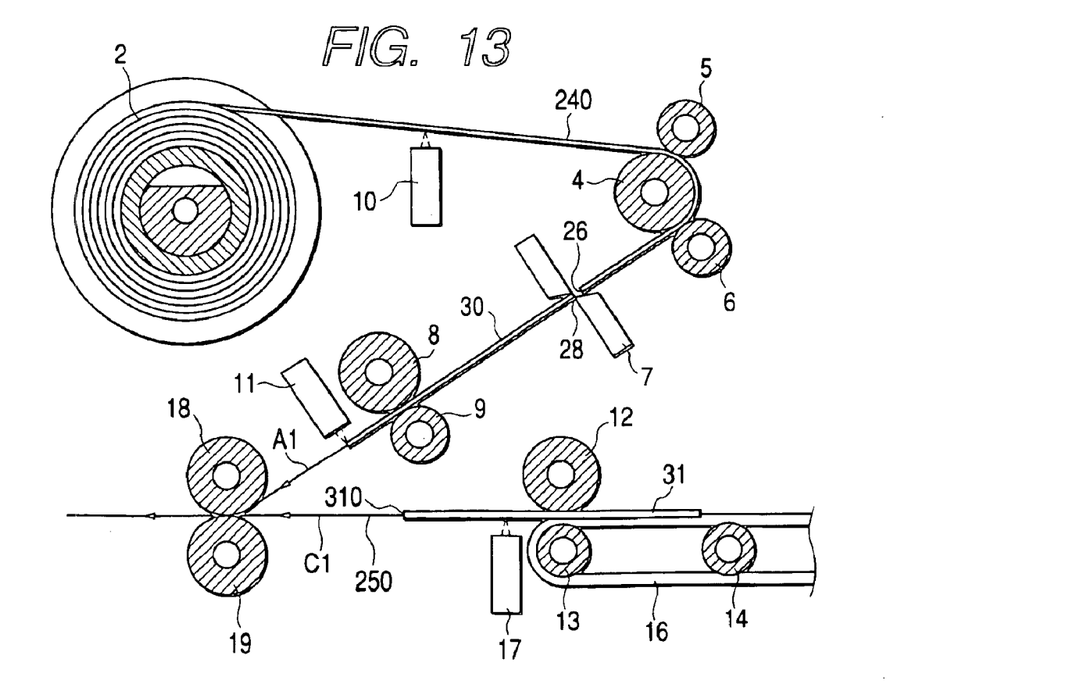
FIG. 13 is a partial schematic front view of the double-side lamination system according to the embodiment of the present invention, immediately after the laminate film is cut.

FIG. 12 is a schematic front view of a part of the double-side lamination system 1 according to the embodiment of the present invention, immediately before the laminate film is cut. FIG. 13 is a schematic front view of a part of the double-side lamination system 1 according to the embodiment of the present invention, immediately after the laminate film is cut.

At the start, both the laminate load electric clutch 408 and the laminate feed electric clutch 418 (FIG. 1) are made "connected" state capable of transmitting the drive force.

The leading edge 29 of the continuous laminate film 24 drawn out from the laminate roll 2 is transferred passing through between the blades of the cutter 7 being driven by the drive force of the laminate film transfer motor 405 (FIG. 1). When the leading edge 29 of the continuous laminate film 24 is detected by the film detection sensor 11, the output signal of the film detection sensor 11 is activated. Based on the change in the output signal of the film detection sensor 11, the double-side lamination system 1 judges that the length of the continuous laminate film 24 existing between the cutter 7 and the film detection sensor 11 has become a predetermined length L to be cut, and stops the laminate film transfer motor 405 to stop momentarily the transfer of the continuous laminate film 24. Then, the cutter 7 is driven to make the cut laminate film 30 having the predetermined length L on the film transfer path 240.

After that, the laminate load electric clutch 408 (FIG. 1) is made "disconnected" state, and then, the laminate film transfer motor 405 is rotated again. The drive force of the laminate film transfer motor 405 is transmitted to the rollers 8 and 9 through the laminate feed electric clutch 418, and the cut laminate film 30 is transferred in the direction indicated by an arrow A1.

After that, a cut laminate film for a top of an ID card and/or another cut laminate film for a back of the ID card, selectively transferred and cut, are respectively laid on the top and/or back of the ID card 31 at the point of convergence. Then, they are laminated by thermocompression bonding using the heat roller 620 and/or the heat roller 621, selectively and under the optimum condition according to the type of each of the rollers.

FIG. 14 is a perspective view of an example of an ID card on the top of which the lamination is completed. As shown in the drawing, the cut laminate film 30 is laminated on the top of the printed ID card 31 with substantially uniform blank spaces 311 to 314, respectively along four sides of the printed ID card 31, for preventing the cut laminate film 30 from peeling off from the surface of the card.

FIG. 15 is a perspective view of an example of an ID card on the back of which the lamination is completed. As shown in the drawing, the cut laminate film 30 is laminated on the back surface of the printed ID card 31, excluding the space where magnetic stripe is provided, for protecting letters recorded on the back surface of the printed ID card 31.

Additionally, when "top surface lamination mode" is selected, lamination is made only on the top surface of the ID card 31, and the back surface is not laminated. Also, when "back surface lamination mode" is selected, lamination is made only on the back surface of the ID card 31, and the top surface is not laminated. Further, when "double-side lamination mode" is selected, lamination is made on each of the surfaces of the ID card 31.

In the above explained double-side lamination system 1 according to the embodiment of the present invention, the card transfer motor 403 and the laminate film transfer motors 405 and 420 are provided separately. However, these motors can be replaced by a single motor connected to the respective rollers through a plurality of electric clutches.

Also, although the explanation is made for a case in which the reflective type optical sensors are used as the sensors for detecting such as the laminate film and the printed ID card, sensors of other types can be used in place of the reflective type optical sensors.

Additionally, PVC are being generally used as the materials of the ID card to be laminated. The lamination system according to the present invention can also be used for a card made of a composite material such as PET-G, and further, the lamination system can be used for any card regardless of the material of which the card is made.

Further, the object to be laminated by the lamination system according to the present invention is not limited to an ID card. The lamination system is applicable to a lamination of a continuous film, being successively cut, on a substrate in the form other than ID card. The idea peculiar to the present invention can be applied even to a lamination system, such as mentioned in the description of the prior art, in which "pre-cut laminate films" on the carriers are used.

In the double-side lamination system 1 according to the embodiment of the present invention, explanation has been made for a case in which the top and the back surfaces of the card are simultaneously laminated by thermocompression bonding using a pair of heat rollers. However, the top and the back surfaces of the card may be separately laminated by thermocompression bonding using two sets of thermocompression bonding devices each of which comprises a heat roller and a platen roller provided along the card transfer path.

What is claimed is:

1. A double-side lamination system comprising:
   a card having an upper surface and a reverse surface;
   a thermocompression bonding device for selectively laminating laminate films each having a heat adhesive layer on a surface, on at least one of the upper surface and the reverse surface of the card,
   a pair of heat rollers for applying heat and pressure to the card,
   at least one temperature sensing element for measuring temperatures of said heat rollers, and
   a controller including
      a heater temperature control part for operatively controlling heaters for said pair of heat rollers;
      an arithmetic processing part controlling whether said double-side lamination system is in a double-side lamination mode in which laminations are carried out on both surfaces of said card, or in a single-side lamination mode in which lamination is carried out on only one of said surfaces of said card, said arithmetic processing part being operatively connected to an output terminal of said at least one temperature sensing element to automatically distinguish between the double-side lamination mode and the single-side lamination mode by comparing measured temperatures of said heat rollers by said at least one temperature sensing element at a predetermined time after turn-on of the power of said double-side lamination system with a predetermined reference temperature.

2. The double-side lamination system according to claim 1, wherein said controller distinguishes a type of said heat roller mounted within said system by a value of temperature of said heat roller at said predetermined time after turn-on of the power of said double-side lamination system, and internal control parameters are automatically optimized according to said type of said heat roller.

3. The double-side lamination system according to claim 1, further comprising a drive system control within said controller wherein a the drive system control of a laminate film transfer path is automatically changed according to whether said double-side lamination system is in said double-side lamination mode or in said single-side lamination mode.

4. The double-side lamination system according to claim 3, wherein said controller distinguishes a type of said heat roller mounted within said system by a value of temperature of said heat roller at said predetermined time after turn-on of the power of said double-side lamination system, and internal control parameters are automatically optimized according to said type of said heat roller.

5. The double-side lamination system according to claim 1, wherein whether said double-side lamination system is in said double-side lamination mode or in said single-side lamination mode is displayed on a control panel of the controller.

6. The double-side lamination system according to claim 5, wherein said controller distinguishes a type of said heat roller mounted within said system by a value of temperature of said heat roller at said predetermined time after turn-on of the power of said double-side lamination system, and internal control parameters are automatically optimized according to said type of said heat roller.

7. The double-side lamination system according to claim 5, further comprising a drive system control within said controller, wherein the drive system control of a laminate film transfer path is automatically changed according to whether said double-side lamination system is in said double-side lamination mode or in said single-side lamination mode.

8. The double-side lamination system according to claim 7, wherein said controller distinguishes a type of said heat roller mounted within said system by a value of temperature of said heat roller at said predetermined time after turn-on of the power of said double-side lamination system, and internal control parameters are automatically optimized according to said type of said heat roller.

9. The double-side lamination system according to claim 1, wherein if one of said measured temperatures of said heat rollers is lower than said reference temperature, then lamination is not carried out for said surface of said card facing said roller of which said measured temperatures is lower than said reference temperature, and single-side lamination for laminating another surface of said card using another said heat roller is automatically carried out.

10. The double-side lamination system according to claim 9, wherein said controller distinguishes a type of said heat roller mounted within said system by a value of temperature of said heat roller at said predetermined time after turn-on of the power of said double-side lamination system, and internal control parameters are automatically optimized according to said type of said heat roller.

11. The double-side lamination system according to claim 9, further comprising a drive system control within said controller, wherein the drive system control of a laminate film transfer path is automatically changed according to whether said double-side lamination system is in said double-side lamination mode or in said single-side lamination mode.

12. The double-side lamination system according to claim 11, wherein said controller distinguishes a type of said heat roller mounted within said system by a value of temperature of said heat roller at said predetermined time after turn-on of the power of said double-side lamination system, and internal control parameters are automatically optimized according to said type of said heat roller.

13. The double-side lamination system according to claim 9, wherein whether said double-side lamination system is in said double-side lamination mode or in said single-side lamination mode is displayed on a control panel of the controller.

14. The double-side lamination system according to claim 13, wherein said controller distinguishes a type of said heat roller mounted within said system by a value of temperature of said heat roller at said predetermined time after turn-on of the power of said double-side lamination system, and internal control parameters are automatically optimized according to said type of said heat roller.

15. The double-side lamination system according to claim 13, further comprising a drive system control within said controller, wherein the drive system control of a laminate film transfer path is automatically changed according to whether said double-side lamination system is in said double-side lamination mode or in said single-side lamination mode.

16. The double-side lamination system according to claim 15, wherein said controller distinguishes a type of said heat roller mounted within said system by a value of temperature of said heat roller at said predetermined time after turn-on of the power of said double-side lamination system, and internal control parameters are automatically optimized according to said type of said heat roller.

17. A double-side lamination system comprising:
a card having an upper surface and a reverse surface;
a pair of laminate films each having a heat adhesive layer on a surface thereof;
a thermocompression bonding device for selectively laminating the laminate films on at least one of the upper surface and the reverse surface of the card;
a pair of heat rollers for applying heat and pressure to at least one of the upper surface and the reverse surface of the card;
at least one temperature sensing element for measuring temperatures of said heat rollers, said at least one temperature sensing element being slidably connected to a surface of at least one of the heat rollers; and
a controller including
an arithmetic processing part controlling whether said double-side lamination system is in a double-side lamination mode in which laminations are carried out on both surfaces of said card, or in a single-side lamination mode in which lamination is carried out on only one of said surfaces of said card, said arithmetic processing part being operatively connected to an output terminal of said at least one temperature sensing element to automatically distinguish between the double-side lamination mode and the single-side lamination mode by comparing measured temperatures of said heat rollers by said at least one temperature sensing element at a predetermined time after turn-on of the power of said double-side lamination system with a predetermined reference temperature;

a card transfer control part;

a laminate film transfer control part;

a cutter drive part;

a clutch drive part;

a sensor signal processing part;

a heater temperature control part for operatively controlling heaters for said pair of heat rollers.

18. The system according to claim 17, further comprising a card transfer motor, wherein said card transfer control part controls an operation of the card transfer motor.

19. The system according to claim 17, further comprising a laminate film transfer motor, wherein said laminate film transfer control part controls an operation of the laminate film transfer motor.

20. The system according to claim 17, further comprising a cutter and an electric clutch, wherein the cutter drive part controls an operation of the cutter and the clutch drive part controls an operation of the electric clutch.

21. The system according to claim 17, wherein a first heater roll of said pair of heater rolls comprises a cylindrical central pipe of aluminum material with a silicone rubber roller surface, said first heater roll being rotatably and detachably to a first heater.

22. The system according to claim 21, wherein a second heater roll of said pair of heater rolls comprises a cylindrical central pipe of aluminum material with a lubricating film roller surface, said second heater roll being rotatably and detachably connected to a second heater.

23. The system according to claim 22, wherein an output terminal of the at least one temperature sensing element is operatively connected to an A-D converter provided in the arithmetic processing unit.

24. The system according to claim 17, wherein a second heater roll of said pair of heater rolls comprises a cylindrical central pipe of aluminum material with a lubricating film roller surface, said second heater roll being rotatably and detachably connected to a second heater.

25. A method of selectively operating the double-side lamination system according to claim 1, the method comprising the steps of:

measuring at least one temperature of at least one heat roller of the pair of heat rollers with said at least one temperature sensing element;

determining and controlling an operation mode of said system with said arithmetic processing part, said arithmetic processing part controlling whether said double-side lamination system is in a double-side lamination mode in which laminations are carried out on both surfaces of said card, or in a single-side lamination mode in which lamination is carried out on only one of said surfaces of said card, said arithmetic processing part being operatively connected to an output terminal of said at least one temperature sensing element to automatically distinguish between the double-side lamination mode and the single-side lamination mode by comparing measured temperatures of said heat rollers by said at least one temperature sensing element at a predetermined time after turn-on of the power of said double-side lamination system with a predetermined reference temperature;

laminating at least one surface of the card device with the thermocompression bonding device; and applying heat and pressure with at least one heat roller of the pair of heat rollers.

26. The method according to claim 25, wherein if one of said measured temperatures of said heat rollers is lower than said reference temperature, then lamination is not carried out for said surface of said card facing said roller of which said measured temperatures is lower than said reference temperature, and single-side lamination for laminating another surface of said card using another said heat roller is automatically carried out.

27. The method according to claim 26, wherein whether said double-side lamination system is in said double-side lamination mode or in said single-side lamination mode is displayed on a control panel of the controller.

28. The method according to claim 25, wherein whether said double-side lamination system is in said double-side lamination mode or in said single-side lamination mode is displayed on a control panel of the controller.

29. The method according to claim 25, wherein a drive system control of a laminate film transfer path is automatically changed according to whether said double-side lamination system is in said double-side lamination mode or in said single-side lamination mode.

30. The method according to claim 25, wherein said controller distinguishes a type of said heat roller mounted within said system by a value of temperature of said heat roller at said predetermined time after turn-on of the power of said double-side lamination system, and internal control parameters are automatically optimized according to said type of said heat roller.

* * * * *